United States Patent
Nilsson et al.

(10) Patent No.: US 9,390,834 B2
(45) Date of Patent: Jul. 12, 2016

(54) POLYMER COMPOSITION

(75) Inventors: Susanne M. Nilsson, Gothenburg (SE); Thomas Hjertberg, Kungshamn (SE); Annika M. Smedberg, Myggenas (SE)

(73) Assignee: Borealis AG, Vienna (AT)

(*) Notice: Subject to any disclaimer, the term of this patent is extended or adjusted under 35 U.S.C. 154(b) by 76 days.

(21) Appl. No.: 13/877,986

(22) PCT Filed: Oct. 5, 2011

(86) PCT No.: PCT/EP2011/067395
§ 371 (c)(1),
(2), (4) Date: Aug. 5, 2013

(87) PCT Pub. No.: WO2012/045777
PCT Pub. Date: Apr. 12, 2012

(65) Prior Publication Data
US 2013/0313000 A1 Nov. 28, 2013

(30) Foreign Application Priority Data

Oct. 7, 2010 (EP) .................................... 10186783

(51) Int. Cl.
*H01B 3/44* (2006.01)
*H01B 19/04* (2006.01)
*C08L 23/08* (2006.01)
*C08K 5/14* (2006.01)
*C08K 5/375* (2006.01)

(52) U.S. Cl.
CPC *H01B 3/44* (2013.01); *C08K 5/375* (2013.01); *H01B 3/441* (2013.01); *H01B 19/04* (2013.01); *C08K 5/14* (2013.01); *C08L 23/083* (2013.01)

(58) Field of Classification Search
CPC .......... H01B 3/44; H01B 19/04; C08L 23/08; C08K 5/14
USPC .............. 524/331; 427/117, 118; 174/120 SR
See application file for complete search history.

(56) References Cited

U.S. PATENT DOCUMENTS

| 4,305,489 A | 12/1981 | Hoppie |
| 4,812,505 A | 3/1989 | Topcik |
| 5,539,075 A | 7/1996 | Gustafsson et al. |
| 2009/0029166 A1 | 1/2009 | Bostrom et al. |
| 2009/0227717 A1* | 9/2009 | Smedberg et al. ............ 524/317 |
| 2010/0036031 A1 | 2/2010 | Herbst et al. |

FOREIGN PATENT DOCUMENTS

| EP | 1695992 | 8/2006 |
| WO | 85/05216 | 11/1985 |
| WO | 99/31675 | 6/1999 |
| WO | 2008/046751 | 4/2008 |
| WO | 2010/072396 | 7/2010 |
| WO | WO 2010072396 A1 * | 7/2010 |

OTHER PUBLICATIONS

G. Pritchard, Plastics Additives: A Rapra Market Report, iSmithers Rapra Publishing, 2005, p. 91 https://books.google.com/books?id=DxY7yJhTIQEC&dq=lrgastab+kv10&source=gbs_navlinks_s.*
Borealis AG: "Wire & Cable Supercure TM High Productivity XLPE," 2010, XP55009940, Retrieved from the Internet: URL:http://www.borealisgroup.com/pdf/literature/borealis-borouge/brochure/K_IN0091_GB_WC_2008_03_BB.pdf [retrieved on Oct. 19, 2011], 16 pgs.
International Search Report and Written Opinion in International Application No. PCT/EP2011/067395 dated Nov. 4, 2011, 13 pgs.

* cited by examiner

*Primary Examiner* — Ling Choi
*Assistant Examiner* — Ronald Grinsted
(74) *Attorney, Agent, or Firm* — Meunier Carlin & Curfman LLC

(57) ABSTRACT

The invention relates to a polymer composition comprising a polyolefin (A) and an antioxidant. The antioxidant can be selected from a phenol which bears two substituents both containing a sulfur atom and optionally further substituent(s). The polymer composition can comprise vinyl groups/1000 carbon atoms in an amount of 0.15/1000 carbon atoms or more. The polymer composition can have improved water tree resistance properties.

19 Claims, No Drawings

POLYMER COMPOSITION

FIELD OF INVENTION

The invention relates to a polymer composition suitable for producing a layer of a cable, to a cable comprising said polymer composition which is preferably crosslinkable, to a process for preparing at least one layer of a wire or cable by using said polymer composition and preferably by crosslinking said wire or cable layer.

BACKGROUND ART

A typical electric power cable generally comprises a conductor that is surrounded by several layers of polymeric materials including an inner semiconducting layer, followed by an insulating layer, and then an outer semiconducting layer. These layers can be crosslinked as well known in the field. To these layers, one or more further auxiliary layer(s) may be added, such as a screen and/or a jacketing layer(s) as the outer layer. The layers of the cable are based on different types of polymers. E.g. low density polyethylene, crosslinked by adding peroxide compounds, is a typical cable insulation material.

Polyolefins, particularly polyethylene is generally used as an electrical insulation material as it has good dielectric properties, especially high breakdown strength. Such insulated cables have, however, a drawback that they suffer from shortened service life when installed and operated in an environment where the polymer is exposed to water, e.g. under ground or at locations of high humidity. The reason is that polyolefins tend to form bush-shaped defects, so-called water trees, when exposed to water under the action of electrical fields. Such defects may be due to inhomogeneities, for instance microcavities and impurities, such as contaminants, occurring in the layer material and they can lead to lower breakdown strength and possibly electric failure when in use.

The appearance of water tree structures are manifold. In principle, it is possible to differentiate between two types:
"Vented trees" which have their starting point on the surface of the semiconductive layer(s) and
"Bow-tie trees" which are initiated within the insulation material often starting from a defect or a contaminant.

Water treeing is a phenomenon that has been studied carefully since the 1970's. Many solutions have been proposed for increasing the resistance of insulating materials to degradation by water-treeing. One solution involves the addition of polyethylene glycol, as water-tree growth inhibitor to a low density polyethylene such as described in U.S. Pat. No. 4,305, 849 and U.S. Pat. No. 4,812,505. Furthermore, the invention WO 99/31675 discloses a combination of specific glycerol fatty acid esters and polyethylene glycols as additives to polyethylene for improving water-tree resistance. Another solution is presented in WO 85/05216 which describes copolymer blends.

Further, EP 1 695 992 describes at least one ether and/or ester group containing additive that is combined with an unsaturated polyolefin in order to provide a polyolefin composition with enhanced crosslinking properties and improved water-tree resistance.

Accordingly, there is a continuous need to find alternative solutions with advantageous water tree resistance properties to overcome the prior art problems.

DESCRIPTION OF THE INVENTION

The invention provides a polymer composition comprising a polyolefin (A) and an antioxidant selected from a phenol which bears two substituents both containing a sulphur atom and optionally further substituent(s), and wherein the polymer composition comprises vinyl groups/ 1000 carbon atoms in an amount of 0.15/1000 carbon atoms or more, when determined according to "double bond content" described below under Determination methods.

Surprisingly, the unsaturation, i.e. the vinyl groups, present in the polymer composition combined with the specific antioxidant compound as defined above has improved water tree resistance (WTR) properties compared to WTR properties of a same polymer composition but without the presence of the above defined amount of vinyl groups, when measured according to WTR method as described below under the determination methods.

The polymer composition of the invention is referred herein below also shortly as "polymer composition". The polymer components thereof as defined above are also shortly referred herein as "polyolefin (A)" and, respectively, "antioxidant".

In general, "vinyl group" means herein $CH_2=CH-$ moiety.

The polymer composition preferably comprises vinyl groups/1000 carbon atoms in an amount of 0.15/1000 carbon atoms or more, preferably in an amount of 0.20/1000 carbon atoms or more, preferably in an amount of 0.25/1000 carbon atoms or more, more preferably in an amount of 0.30/1000 carbon atoms or more. More preferably, the amount of vinyl groups/1000 carbon atoms present in the polymer composition is less than 4.0/1000 carbon atoms, more preferably less than 3.0/1000 carbon atoms.

The polymer composition comprises vinyl groups as carbon-carbon double bonds, which vinyl groups originate preferably from
i) a polyunsaturated (co)monomer,
ii) a chain transfer agent,
iii) an unsaturated low molecular weight compound which is e.g. a compound known as a crosslinking booster or as a scorch retarder, or
iv) any mixture of (i) to (iii).

The total amount of vinyl groups means herein the sum of the vinyl groups present in the vinyl-group sources, if many sources. It is evident that a characteristic model compound for calibration is used for each chosen source to enable the quantitative infrared (FTIR) determination. The total amount of vinyl-groups means herein double bonds determined from the source(s) that are known and deliberately added to contribute to the unsaturation.

It is preferred that the polymer composition comprises a polyolefin (A) which is unsaturated and comprises vinyl groups in a amount as defined above or below or in claims.

The polymer composition preferably further comprises one or more crosslinking agent(s). The preferred crosslinking agent is a free radical generating agent, preferably a free radical generating agent containing —O—O— bond or —N=N-bond.

More preferably, the crosslinking agent is a peroxide. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl) benzene, 2,5-dimethyl-2,5-di(benzoylperoxy)hexane, 1,1-di(tert-butylperoxy)cyclohexane, 1,1-di(tert amylperoxy) cyclohexane, or any mixtures thereof, can be mentioned.

Preferably, the peroxide is selected from 2,5-di(tert-butylperoxy)-2,5-dimethyl hexane, di(tert-butylperoxyisopropyl) benzene, dicumylperoxide, tert-butylcumylperoxide, di(tert-butyl)peroxide, or mixtures thereof. Most preferably, the peroxide is dicumylperoxide.

Preferably, the polymer composition comprises the crosslinking agent, preferably peroxide, in an amount of less than 10 wt %, less than 6 wt %, more preferably of less than 5 wt %, less than 3.5 wt %, even more preferably from 0.1 wt % to 3 wt %, and most preferably from 0.2 wt % to 2.6 wt %, based on the total weight of the polymer composition.

Accordingly, the polymer composition is preferably crosslinkable and optionally, and preferably, is in crosslinked form at the end use thereof. "Crosslinkable" is a well known expression and means that the Polyolefin Composition can be crosslinked, e.g. via radical formation, to form bridges i.a. amongst the polymer chains.

Any double bond measurements are carried out prior to optional crosslinking. Moreover, it is evident that the below given polyolefin (A) descriptions apply to the polyolefin prior optional crosslinking.

The polymer composition of the invention may naturally contain further components, such as further polymer component(s), additive(s) or any mixtures thereof.

As an example only such additives include one or more of antioxidants, stabilisers, processing aids, scorch retardants, crosslinking boosters or water tree retardants, or any mixtures thereof. As antioxidant, sterically hindered or semi-hindered phenols, optionally substituted with functional group(s), aromatic amines, aliphatic sterically hindered amines, organic phosphates, thio compounds, and mixtures thereof, can be mentioned. Typical cross-linking boosters may include compounds having a vinyl or an allyl group, e.g. triallylcyanurate, triallylisocyanurate, and di-, tri- or tetra-acrylates. As preferable scorch retardants, e.g. unsaturated dimers of aromatic alpha-methyl alkenyl monomers, such as 2,4-di-phenyl-4-methyl-1-pentene, can be mentioned. Such scorch retardants can also act as crosslinking boosters. As further additives, flame retardant additives, acid scavengers, fillers, such as carbon black, and voltage stabilizers can be mentioned. All the above mentioned additives are well known in polymer field. Such compositions are very useful for wire and cable applications, such as for cables of the invention discussed below.

The polymer composition of the invention comprises typically at least 50 wt %, preferably at least 75 wt %, preferably from 80 to 100 wt % and more preferably from 85 to 100 wt %, of the polyolefin (A) based on the total weight of the polymer component(s) present in the polymer composition. The preferred polymer composition consists of polyolefin (A) as the only polymer component. The expression means that the polymer composition does not contain further polymer components, but the polyolefin (A) as the sole polymer component. However, it is to be understood herein that the antioxidant of the polymer composition or further components other than polymer components, such as additives which may optionally be added in a mixture with a carrier polymer, i.e. in so called master batch. In such cases the carrier polymer of the master batch is not calculated to the amount of the polymer components, but to the total amount of the polymer composition.

The following preferable embodiments, properties and subgroups of the polyolefin (A) and the antioxidant components suitable for the polymer composition are independently generalisable so that they can be used in any order or combination to further define the preferable embodiments of the polymer composition and the cable produced using the polymer composition as described below.

As to antioxidant, e.g. any conventional or commercially available phenolic antioxidant with the substitution as defined above or below are suitable for the polymer composition. The antioxidant is preferably bis[(C1-C12)alkylthio(C1-C12)alkyl]phenol which optionally bears further substituent(s).

In a preferable embodiment of the polymer composition the antioxidant is 2,4-bis(octylthiomethyl)-6-methylphenol (CAS number 110553-27-0) which is commercially available, e.g. sold as Irgastab® Cable KV10 product, supplied by Ciba, and which has a following structure:

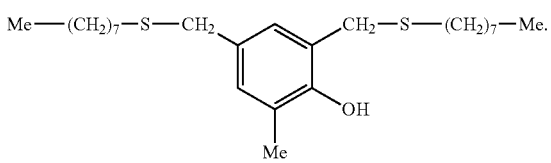

It is preferred that the polymer composition comprises the antioxidant of the invention as the only antioxidant. This means that no compounds conventionally known as W&C antioxidant are present.

As to polyolefin (A), a suitable polyolefin can be any conventional polyolefin, in particular which can be used in a layer of a cable, preferably of a power cable. Such suitable polyolefins are, for example, well known and can be commercially available or can be prepared according to or analogously to known polymerization processes described in the chemical literature. Where herein it is referred to a "polymer", e.g. polyolefin, this is intended to mean both a homo- and copolymer, e.g. an olefin homo- or copolymer, such as an ethylene homo- and copolymer. The polyolefin copolymer may contain one or more comonomer(s). As well known, the term "comonomer" refers to copolymerisable comonomer units.

In the preferred embodiment of the polymer composition as mentioned above, the polyolefin (A) is unsaturated and comprises vinyl groups/1000 carbon atoms in an amount of 0.15/1000 carbon atoms or more, preferably in an amount of 0.20/1000 carbon atoms or more, preferably in an amount of 0.25/1000 carbon atoms or more, more preferably in an amount of 0.30/1000 carbon atoms or more, and preferably the amount of vinyl groups is less than 4.0/1000 carbon atoms, more preferably is less than 3.0/1000 carbon atoms.

As also well known, "unsaturated polyolefin (A)" means herein both 1) a homopolymer or a copolymer, wherein the unsaturation is provided by a chain transfer agent or by adjusting the process conditions, or both, and 2) a copolymer, wherein the unsaturation is provided at least by polymerizing a monomer together with at least a polyunsaturated comonomer and optionally by other means, such as by adjusting the polymer conditions or by a chain transfer agent.

In this preferred embodiment the unsaturated polyolefin (A) is preferably an unsaturated polyethylene. In general, for polyethylene, ethylene will form the major monomer content present in any polyethylene polymer.

Where the unsaturated polyolefin (A) is an unsaturated copolymer of ethylene with at least one comonomer, then suitable comonomer(s) are selected from polyunsaturated comonomer(s), and further comonomer(s), such as non-polar comonomer(s) other than polyunsaturated comonomer(s) or polar comonomer(s), or any mixtures thereof. The polyunsaturated comonomers and further comonomers, i.e. non-polar comonomers other than polyunsaturated comonomers and polar comonomers are described below in relation to polyethylene produced in a high pressure process.

If the preferred unsaturated polyolefin (A) is a copolymer, it preferably comprises 0.001 to 50 wt.-%, more preferably 0.05 to 40 wt.-%, still more preferably less than 35 wt.-%, still more preferably less than 30 wt.-%, more preferably less than 25 wt.-%, of one or more comonomer(s).

Preferably, the unsaturated polyolefin (A) is an unsaturated polyethylene produced in the presence of an olefin polymerisation catalyst or a polyethylene produced in a high pressure process.

"Olefin polymerisation catalyst" means herein preferably a conventional coordination catalyst. It is preferably selected from a Ziegler-Natta catalyst, single site catalyst which term comprises a metallocene and a non-metallocene catalyst, or a chromium catalyst, or any mixture thereof. The terms have a well known meaning.

In general, the polyethylene polymerised in the presence of an olefin polymerisation catalyst is also often called as "low pressure polyethylene" to distinguish it clearly from polyethylene produced under high pressure. Both expressions are well known in the polyolefin field. Low pressure polyethylene can be produced in polymerisation process operating i.a. in bulk, slurry, solution, or gas phase conditions or in any combinations thereof. The olefin polymerisation catalyst is typically a coordination catalyst. More preferably, the unsaturated polyolefin (A) is selected from an unsaturated homopolymer or a unsaturated copolymer of ethylene produced in the presence of a coordination catalyst or produced in a high pressure polymerisation process.

In said preferred embodiment of the polymer composition it is more preferred that the unsaturated polyolefin (A) is an unsaturated polyethylene produced in a high pressure polymerisation process, preferably by radical polymerisation in the presence of an initiator(s). More preferably the unsaturated polyolefin (A) is an unsaturated low density polyethylene (LDPE). It is to be noted that a polyethylene produced in a high pressure (HP) is referred herein generally as LDPE which term has a well known meaning in the polymer field. Although the term LDPE is an abbreviation for low density polyethylene, the term is understood not to limit the density range, but covers the LDPE-like HP polyethylenes with low, medium and higher densities. The term LDPE describes and distinguishes only the nature of HP polyethylene with typical features, such as high branching degree, compared to the PE produced in the presence of an olefin polymerisation catalyst.

This more preferred unsaturated LDPE polymer can be an unsaturated low density homopolymer of ethylene (referred herein as unsaturated LDPE homopolymer) or an unsaturated low density copolymer of ethylene with one or more comonomer(s) (referred herein as unsaturated LDPE copolymer).

If the unsaturated LDPE is an unsaturated LDPE homopolymer, then the unsaturation can be provided e.g. by a chain transfer agent (CTA), such as propylene, and/or by polymerization conditions as mentioned above. If the unsaturated LDPE polymer is an unsaturated LDPE copolymer, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is preferably an unsaturated LDPE copolymer of ethylene with at least one polyunsaturated comonomer, and optionally with other comonomer(s), such as polar comonomer(s) as described below.

In said preferred embodiment of the polymer composition, it is most preferred that the unsaturated polyolefin (A) is an unsaturated LDPE copolymer of ethylene with at least a polyunsaturated comonomer(s). The polyunsaturated comonomer(s) suitable for the unsaturated polyolefin preferably consist of a straight carbon chain with at least 8 carbon atoms and at least 4 carbons between the non-conjugated double bonds, of which at least one is terminal. More preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

In said preferred embodiment of the polymer composition, where the unsaturated polyolefin (A) is the unsaturated LDPE copolymer of ethylene with at least a polyunsaturated comonomer, the vinyl groups present in the polymer composition originate at least partly from the polyunsaturated comonomer. More preferably, the total amount of said vinyl groups which originate from the polyunsaturated comonomer is, in the given preference order, of 0.15/1000 carbon atoms or more, preferably of 0.20/1000 carbon atoms or more, preferably of 0.25/1000 carbon atoms or more, more preferably of 0.30/1000 carbon atoms or more, and preferably less than 4.0/1000 carbon atoms, more preferably less than 3.0/1000 carbon atoms.

Naturally the most preferred unsaturated LDPE polymer may comprise further carbon-carbon double bonds, such as those which typically originate from vinylidene groups and trans-vinylene groups, if present.

As already mentioned, the most preferred unsaturated LDPE copolymer of ethylene with at least a polyunsaturated comonomer may optionally comprise "further" comonomer(s). Such "further" comonomers are preferably selected from the polar comonomer(s), non-polar comonomer(s) other than polyunsaturated comonomers or from a mixture of the polar comonomer(s) and such non-polar comonomer(s).

As a polar comonomer for the unsaturated LDPE copolymer as said most preferred unsaturated polyolefin (A), if present, then comonomer(s) containing hydroxyl group(s), alkoxy group(s), carbonyl group(s), carboxyl group(s), ether group(s) or ester group(s), or a mixture thereof, can be used. More preferably, comonomer(s) containing carboxyl and/or ester group(s) can be used as said polar comonomer. Still more preferably, if present, the polar comonomer(s) of LDPE copolymer is selected from the groups of acrylate(s), methacrylate(s) or acetate(s), or any mixtures thereof. If present in said preferred unsaturated LDPE copolymer, the polar comonomer(s) is preferably selected from the group of alkyl acrylates, alkyl methacrylates or vinyl acetate, or a mixture thereof. Further preferably, said optional polar comonomers can be selected from $C_1$- to $C_6$-alkyl acrylates, $C_1$- to $C_6$-alkyl methacrylates or vinyl acetate. The optionally polar unsaturated LDPE copolymer is most preferably a copolymer of ethylene with $C_1$- to $C_4$-alkyl acrylate, such as methyl, ethyl, propyl or butyl acrylate, or vinyl acetate, or any mixture thereof.

As the non-polar comonomer(s) other than polyunsaturated comonomers for the unsaturated LDPE copolymer as said most preferred polyolefin (A), if present, then comonomer(s) other than the above defined polar comonomers can be used. Preferably, such non-polar comonomers are other than comonomer(s) containing hydroxyl group(s), alkoxy group(s), carbonyl group(s), carboxyl group(s), ether group(s) or ester group(s). If present, then preferable non-polar comonomer(s) can be selected from monounsaturated (=One double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; a silane group containing comonomer(s); or any mixtures thereof.

It is well known that e.g. propylene can be used as a comonomer or as a chain transfer agent (CTA), or both, whereby it can contribute to the total amount of the vinyl groups. Herein, when a compound which can also act as comonomer, such as propylene, is used as CTA for providing double bonds, then said copolymerisable comonomer is not calculated to the comonomer content.

Typically, and preferably in wire and cable (W&C) applications, the density of the polyolefin (A), preferably of the unsaturated LDPE homopolymer or copolymer, is higher than 860 kg/m³. Preferably the density of the polyolefin (A), preferably of the unsaturated LDPE homopolymer or copolymer, is not higher than 960 kg/m³, and preferably is from 900 to 945 kg/m³. The $MFR_2$ (2.16 kg, 190° C.) of the polyolefin (A), preferably of the unsaturated LDPE homopolymer or copolymer, is preferably from 0.01 to 50 g/10 min, more preferably from 0.01 to 30.0 g/10, more preferably is from 0.1 to 20 g/10 min, and most preferably is from 0.2 to 10 g/10 min.

In most preferred embodiment of the polymer composition the polyolefin (A) is the unsaturated LDPE polymer as defined above, preferably an unsaturated LDPE copolymer of ethylene with at least a polyunsaturated comonomer and the antioxidant is 2,4-bis(octylthiomethyl)-6-methylphenol (CAS number 110553-27-0).

Accordingly, the polyolefin (A) of the invention is preferably a LDPE polymer, preferably an unsaturated LDPE copolymer of ethylene with at least a polyunsaturated comonomer, which is preferably produced at high pressure by free radical initiated polymerisation (referred to as high pressure (HP) radical polymerization). The HP reactor can be e.g. a well known tubular or autoclave reactor or a combination thereof, preferably a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

After the separation the obtained LDPE is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

As mentioned above, the vinyl group content of the unsaturated LDPE copolymer of ethylene with at least a polyunsaturated comonomer can be adjusted e.g. with any of the following means: by polymerising the ethylene e.g. in the presence of one or more polyunsaturated comonomer(s), optionally in the presence of a chain transfer agent(s), using the desired feed ratio between monomer, preferably ethylene, and polyunsaturated comonomer and optionally of the chain transfer agent, as known for a skilled person. I.a. WO 9308222 describes a high pressure radical polymerisation of ethylene with polyunsaturated monomers. As a result the unsaturation can be uniformly distributed along the polymer chain in random copolymerisation manner. Also e.g. WO 9635732 describes high pressure radical polymerisation of ethylene and a certain type of polyunsaturated $\alpha,\omega$-divinyl-siloxanes.

The polymer composition of the invention is highly suitable for wire and cable applications, particularly as a layer material of a cable.

The invention also provides a cable which is selected from
a cable (A) comprising a conductor surrounded by at least one layer comprising, preferably consisting of, the polymer composition which comprises
a polyolefin (A) and
an antioxidant selected from a phenol which bears two substituents both containing a sulphur atom and optionally further substituent(s), and
wherein the polymer composition comprises vinyl groups/1000 carbon atoms in an amount of 0.15/1000 carbon atoms or more, when determined according to "double bond content" described below under Determination methods, as defined above or in claims; or
a cable (B) comprising a conductor surrounded by an inner semiconductive layer, an insulating layer and an outer semiconductive layer, wherein at least the insulation layer comprises, preferably consists of, the polymer composition which comprises
a polyolefin (A) and
an antioxidant selected from a phenol which bears two substituents both containing a sulphur atom and optionally further substituent(s), and
wherein the polymer composition comprises vinyl groups/1000 carbon atoms in an amount of 0.15/1000 carbon atoms or more, when determined according to "double bond content" described below under Determination methods, as defined above or in claims.

The term "conductor" means herein above and below that the conductor comprises one or more wires. Moreover, the cable may comprise one or more such conductors.

Preferably the conductor is an electrical conductor and comprises one or more metal wires.

"Semiconductive layer" means herein that said layer comprises a conductive filler, such as carbon black and has a volume resistivity of 100 000 Ω-cm or below when measured at 23° C. or 90° C., or, when measured according to ISO 3915 (1981) using a plaque, has a volume resistivity of 100 Ω-cm or below at 23° C., or of 1000 Ω-cm or below at 90° C.

The cable of the invention is preferably a power cable selected from a LV, MV, HV or extra high voltage (EHV) cable. The cable (A) is preferably a LV or a MV cable.

The cable (B) is preferably a power cable operating at any voltages, e.g. is a MV cable, a HV cable or EHV cable.

The outer semiconductive layer of the cable (B) can be bonded or strippable, i.e. peelable, which terms have a well known meaning.

Preferred cable comprises a layer of a crosslinkable polymer composition.

The most preferred cable is the cable (B), which is a power cable and preferably crosslinkable.

Insulating layers for medium or high voltage power cables generally have a thickness of at least 2 mm, typically of at least 2.3 mm, and the thickness increases with increasing voltage the cable is designed for.

As well known the cable can optionally comprise further layers, e.g. layers surrounding the insulation layer or, if present, the outer semiconductive layers, such as screen(s), a jacketing layer(s), other protective layer(s) or any combinations thereof.

As already mentioned the cable of the invention is preferably crosslinkable. Accordingly, further preferably the cable is preferably a crosslinked cable (A), wherein at least one layer comprises a crosslinkable polymer composition of the invention which is crosslinked before the subsequent end use; or, and preferably, a crosslinked cable (B), wherein at least the insulation layer comprises crosslinkable polymer composition of the invention which is crosslinked before the subsequent end use.

The invention further provides a process for producing
(i) a cable (A) as defined above, wherein the process comprises the steps of (a1) providing and mixing, preferably meltmixing in an extruder, a polymer composition which comprises vinyl groups/1000 carbon atoms in an amount of 0.15/1000 carbon atoms or more, when determined according to "double bond content" described below under Determination methods, as defined above or in claims;
(b1) applying the meltmix of the polymer composition obtained from step (a1), preferably by (co)extrusion, on a conductor to form at least one layer of the cable (A); and
(c1) optionally crosslinking the obtained at least one layer in the presence of the crosslinking agent; or
(ii) a cable (B) as defined above comprising a conductor surrounded by an inner semiconductive layer, an insulation layer, and an outer semiconductive layer, in that order, wherein the process comprises the steps of (a1)
  providing and mixing, preferably meltmixing in an extruder, a first semiconductive composition comprising a polymer, a conductive filler and optionally further component(s) for the inner semiconductive layer,
  providing and mixing, preferably meltmixing in an extruder, a polymer composition for the insulation layer,
  providing and mixing, preferably meltmixing in an extruder, a second semiconductive composition comprising a polymer, a conductive filler and optionally further component(s) for the outer semiconductive layer;
(b1)
  applying on a conductor, preferably by coextrusion,
  the meltmix of the first semiconductive composition obtained from step (a1) to form the inner semiconductive layer,
  the meltmix of polymer composition obtained from step (a1) to form the insulation layer, and
  the meltmix of the second semiconductive composition obtained from step (a1) to form the outer semiconductive layer,
wherein at least the polymer composition of the obtained insulation layer comprises, preferably consists of, a polymer composition which comprises vinyl groups/1000 carbon atoms in an amount of 0.15/1000 carbon atoms or more, when determined according to "double bond content" described below under Determination methods, as defined above or in claims; and
(c1) optionally crosslinking the obtained insulation layer, optionally the obtained inner semiconductive layer and optionally the outer semiconductive layer in the presence of a crosslinking agent.

The term "(co)extrusion" means herein that in case of two or more layers, said layers can be extruded in separate steps, or at least two or all of said layers can be coextruded in a same extrusion step, as well known in the art. The term "(co) extrusion" means herein also that all or part of the layer(s) are formed simultaneously using one or more extrusion heads.

As well known a meltmix of the polymer composition or component(s) thereof, is applied to form a layer. Meltmixing means mixing above the melting point of at least the major polymer component(s) of the obtained mixture and is carried out for example, without limiting to, in a temperature of at least 10° C., or at least 15° C., above the melting or softening point of polymer component(s). The meltmixing can be carried out in the cable extruder. The mixing step (a1) may comprise a separate mixing step in a separate mixer, e.g. kneader, arranged in connection and preceding the cable extruder of the cable production line. Mixing in the preceding separate mixer can be carried out by mixing with or without external heating (heating with an external source) of the component(s).

The polymer composition can be produced before or during the cable production process. Moreover the polymer composition(s) of the layer(s) can each independently comprise part or all of the components of the final composition, before providing to the (melt)mixing step (a1) of the cable production process. Then the remaining component(s) are provided prior to or during the cable formation.

Accordingly, the polymer composition is provided to step (a1) already in a form of a blend which is produced beforehand by mixing the polyolefin (A) and the antioxidant together; or the polyolefin (A) and the antioxidant are provided separately to step (a1) and mixed together during the mixing step (a1) to form the polymer composition.

When the polymer composition is provided to step (a1) as a blend, then the antioxidant can be mixed with the polyolefin (A), e.g. by meltmixing, and the obtained meltmix is pelletized to pellets for use in cable production. Pellets mean herein generally any polymer product which is formed from reactor-made polymer (obtained directly from the reactor) by post-reactor modification to a solid polymer particles. Pellets can be of any size and shape. The obtained pellets are then used in step (a1) of the cable production process.

Alternatively, the polyolefin (A) and the antioxidant can be provided separately to the cable production line.

In the preferred cable production process the antioxidant is added to polyolefin (A) in form of a liquid to form the blend which is then provided to step (a1) or the antioxidant is added separately in liquid form to polyolefin (A) during the mixing step (a1). Preferably the antioxidant product is in liquid state e.g. at room temperature. If not, then it can be dissolved in a solvent or melted before the addition. The addition of the antioxidant contributes beneficially to the desired improved WTR property.

All or part of the optional other component(s), such as further polymer component(s) or additive(s) can be present in the polymer composition before providing to the cable preparation process or can be added, e.g by the cable producer, during the cable production process.

If, and preferably, the polymer composition is crosslinked after cable formation, then the crosslinking agent is preferably a peroxide, which can be mixed with the components of the polymer composition before or during step (a1). It is preferred that the peroxide is added in form of a liquid to the polyolefin (A). Still more preferably, the crosslinking agent, preferably peroxide, is impregnated to the solid polymer pellets of the polymer composition. The obtained pellets are then provided to the cable production step. Due to unsaturation the amount of peroxide can be decreased. Thus the amount of the preferable liquid peroxide can be decreased and the antioxidant can also be added in liquid form, however still maintaining a beneficial low amount of added liquids to the polyolefin (A). As a result good quality and excellent WTR properties are obtained.

Most preferably, the polymer composition of the invention is provided to the step (a1) of the cable production process in a suitable product form, such as a pellet product.

As mentioned, the polymer composition is preferably crosslinkable and preferably the pellets of the polymer composition comprise also the peroxide before providing to the cable production line.

In the preferred cable production process the obtained cable is crosslinked in step (c1), more preferably the at least one layer of formed cable (A) or at least the insulation layer of the formed cable (B) is crosslinked in step (c1) in the presence of a free radical forming agent, preferably peroxide.

As above, the preferred cable production process embodiment of the invention is for producing a power cable (B).

Most preferably, the cable, preferably the power cable (B), of the invention is crosslinked after the formation of cable layers. In this preferred cable production embodiment a power cable (B) is produced, wherein at least the insulation layer of cable (B) comprises the polymer composition as defined above or in claims and wherein the insulation layer, optionally the inner semiconductive layer and optionally the outer semiconductive layer of the cable (B) is crosslinked in the crosslinking step via radical reaction, preferably in the presence of a crosslinking agent which is preferably peroxide.

In above crosslinking process step (c1) of the invention crosslinking conditions can vary depending i.a. on the used crosslinking method, and cable size. The crosslinking of the invention is effected e.g. in a known manner preferably in an elevated temperature. A skilled person can choose the suitable crosslinking conditions e.g. for crosslinking via radical reaction or via hydrolysable silane groups. As non-limiting example of a suitable crosslinking temperature range, e.g. at least 150° C. and typically not higher than 360° C.

Determination Methods

Unless otherwise stated the below determination methods were used to determine the properties defined generally in the description part and claims and in the experimental part.

Wt %: % by weight

Melt Flow Rate: The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$). The MFR is determined at 230° C. for polypropylenes.

Density: Low density polyethylene (LDPE): The density is measured according to ISO 1183-2. The sample preparation was executed according to ISO 1872-2 Table 3 Q (compression moulding).

Comonomer Contents a) Comonomer Content in Random Copolymer of Polypropylene:

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$N=k1(A/R)+k2$ wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 $cm^{-1}$) or block-like (as in heterophasic PP copolymer) (720 $cm^{-1}$). The absorbance at 4324 $cm^{-1}$ was used as a reference band.

b) Quantification of Alpha-Olefin Content in Linear Low Density Polyethylenes and Low Density Polyethylenes by NMR Spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125 C, a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

c) Comonomer Content of Polar Comonomers in Linear Low Density Polyethylene (1) Polymers Containing >6 wt. % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 cm$^{-1}$ was divided with the peak height of polyethylene at 2020 cm$^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 cm$^{-1}$ was subtracted with the absorbance value for the base line at 2475 cm$^{-1}$ ($A_{methylacrylate}$-$A_{2475}$). Then the maximum absorbance peak for the polyethylene peak at 2660 cm$^{-1}$ was subtracted with the absorbance value for the base line at 2475 cm$^{-1}$ ($A_{2660}$-$A_{2475}$). The ratio between ($A_{methylacrylate}$-$A_{2475}$) and ($A_{2660}$-$A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 Wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}$-$A_{1850}$). Then the maximum absorbance peak for polyethylene peak at 2660 cm$^{-1}$ was subtracted with the absorbance value for the base line at 1850 cm$^{-1}$ ($A_{2660}$-$A_{1850}$). The ratio between ($A_{comonomer}$-$A_{1850}$) and ($A_{2660}$-$A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

Below is exemplified how polar comonomer content obtained from the above method (1) or (2), depending on the amount thereof, can be converted to micromol or mmol per g polar comonomer as used in the definitions in the text and claims:

The millimoles (mmol) and the micro mole calculations have been done as described below.

For example, if 1 g of the poly(ethylene-co-butylacrylate) polymer, which contains 20 wt % butylacrylate, then this material contains 0.20/$M_{butylacrylate}$ (128 g/mol)=1.56×10$^{-3}$ mol. (=1563 micromoles).

The content of polar comonomer units in the polar copolymer $C_{polar\ comonomer}$ is expressed in mmol/g (copolymer). For example, a polar poly(ethylene-co-butylacrylate) polymer which contains 20 wt. % butyl acrylate comonomer units has a $C_{polar\ comonomer}$ of 1.56 mmol/g.

The used molecular weights are: $M_{butylacrylate}$=128 g/mole, $M_{ethylacrylate}$=100 g/mole, $M_{methylacrylate}$=86 g/mole).

Carbon-Carbon Double Bond Content:

A) Quantification of the Amount of Carbon-Carbon Double Bonds by IR Spectroscopy Quantitative infrared (IR) spectroscopy was used to quantify the amount of carbon-carbon double bonds (C=C). Calibration was achieved by prior determination of the molar extinction coefficient of the C=C functional groups in representative low molecular weight model compounds of known structure.

The amount of each of these groups (N) was determined as number of carbon-carbon double bonds per thousand total carbon atoms (C=C/1000C) via:

$$N=(A\times14)/(E\times L\times D)$$

were A is the maximum absorbance defined as peak height, E the molar extinction coefficient of the group in question (l·ml$^{-1}$·mm$^{-1}$), L the film thickness (mm) and D the density of the material (g·cm$^{-1}$).

The total amount of C=C bonds per thousand total carbon atoms can be calculated through summation of N for the individual C=C containing components.

For polyethylene samples solid-state infrared spectra were recorded using a FTIR spectrometer (Perkin Elmer 2000) on compression moulded thin (0.5-1.0 mm) films at a resolution of 4 cm$^{-1}$ and analysed in absorption mode.

1) Polymer Compositions Comprising of Polyethlene Homopolymers and Copolymers, Except Polyethylene Copolymers with >0.4 Wt % Polar Comonomer For polyethylenes three types of C=C containing functional groups were quantified, each with a characteristic absorption and each calibrated to a different model compound resulting in individual extinction coefficients:
  vinyl (R—CH=CH$_2$) via 910 cm$^{-1}$ based on 1-decene [dec-1-ene] giving E=13.13 l·mol$^{-1}$·mm$^{-1}$
  vinylidene (RR'C=CH$_2$) via 888 cm$^{-1}$ based on 2-methyl-1-heptene [2-methyhept-1-ene] giving E=18.24 l·mol$^{-1}$·mm$^{-1}$
  trans-vinylene (R—CH=CH—R') via 965 cm$^{-1}$ based on trans-4-decene [(E)-dec-4-ene] giving E=15.14 l·mol$^{-1}$·mm$^{-1}$ For polyethylene homopolymers or copolymers with <0.4 wt % of polar comonomer linear baseline correction was applied between approximately 980 and 840 cm$^{-1}$.

2) Polymer Compositions Comprising Polyethylene Copolymers with >0.4 Wt % Polar Comonomer For polyethylene copolymers with >0.4 wt % of polar comonomer two types of C=C containing functional groups were quantified, each with a characteristic absorption and each calibrated to a different model compound resulting in individual extinction coefficients:
  vinyl (R—CH=CH2) via 910 cm$^{-1}$ based on 1-decene [dec-1-ene] giving E=13.13 l·mol$^{-1}$·mm$^{-1}$
  vinylidene (RR'C=CH2) via 888 cm$^{-1}$ based on 2-methyl-1-heptene [2-methyl-hept-1-ene] giving E=18.24 l·mol$^{-1}$·mm$^{-1}$

EBA:

For poly(ethylene-co-butylacrylate) (EBA) systems linear baseline correction was applied between approximately 920 and 870 cm$^{-1}$.

EMA:

For poly(ethylene-co-methylacrylate) (EMA) systems linear baseline correction was applied between approximately 930 and 870 cm$^{-1}$.

3) Polymer Compositions Comprising Unsaturated Low Molecular Weight Molecules

For systems containing low molecular weight C=C containing species direct calibration using the molar extinction coefficient of the C=C absorption in the low molecular weight species itself was undertaken.

B) Quantification of Molar Extinction Coefficients by IR Spectroscopy

The molar extinction coefficients were determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 cm$^{-1}$.

The molar extinction coefficient (E) was determined as l·mol$^{-1}$·mm$^{-1}$ via:

$$E = A/(C \times L)$$

where A is the maximum absorbance defined as peak height, C the concentration (mol·l$^{-1}$) and L the cell thickness (mm).

At least three 0.18 mol·l$^{-1}$ solutions in carbondisulphide (CS$_2$) were used and the mean value of the molar extinction coefficient determined.

Water Treeing Test Method:

The samples were prepared according to ASTM D6097-97a, which is a water treeing test method. Plaques were prepared from pellets containing both the antioxidant and the peroxide (the antioxidant and the peroxide are added in form of a liquid and separately to polymer) by preheating for 5 min and compression moulding for 5 min at 120° C., 20 bars and 5 min at 120° C. at 200 bars followed by cooling to room temperature with a cooling rate of 14° C./min. From this plaque 12 circular disc shaped specimens with a needle deformation were prepared and crosslinked in a mould especially designed for this type of water treeing test. For this second preparation step the plaque was preheated for 10 min and thereafter moulded for 10 min at 120° C. at 20 bars and then crosslinked for 10 min at 180° C. at 200 bars followed by cooling to room temperature by a cooling rate of 14° C. The resulting disc samples had a thickness or around 6.4 mm, a diameter of around 25.4 mm and a needle depth of around 3.2 mm. These discs were degassed for 168 h at 80° C. under vacuum to remove by-product originating from the peroxide. The specimens were fixed in an insulating box which was placed in a water bath filled with 0.01 M sodium chloride electrolyte and water trees were grown at 5 kV and 1000 Hz for 30 days at room temperature. After completed ageing the test specimens were sliced with a microtome to 150-300 μm thick samples which were stained with methylene blue for approximately 1 h. The length and the width of the water trees were determined by a visual inspection in a light microscope.

Experimental Part

The following components were used in the inventive examples of the polymer composition of the invention given below.

LDPE 1: Ethylene-1,7-octadiene copolymer

Purified ethylene was liquefied by compression and cooling to a pressure of 90 bars and a temperature of −30° C. and split up into to two equal streams of roughly 14 tons/hour each. The CTA (methyl ethyl ketone (MEK)), air and a commercial peroxide radical initiator dissolved in a solvent were added to the two liquid ethylene streams in individual amounts. 1,7-octadiene as a comonomer was added to the reactor in amount of 190 kg/h. The two mixtures were separately pumped through an array of 4 intensifiers to reach pressures of 2200-2300 bars and exit temperatures of around 40° C. These two streams were respectively fed to the front (zone 1) (50%) and side (zone 2) (50%) of a split-feed two-zone tubular reactor. The inner diameters and lengths of the two reactor zones were 32 mm and 200 m for zone 1 and 38 mm and 400 m for zone 2. MEK was added in amounts of 115 kg/h to the front stream to maintain a MFR$_2$ of around 2.1 g/10 min. The front feed stream was passed through a heating section to reach a temperature sufficient for the exothermal polymerization reaction to start. The reaction reached peak temperatures were 253° C. and 290° C. in the first and second zones, respectively. The side feed stream cooled the reaction to an initiation temperature of the second zone of 165° C.

Air and peroxide solution was added to the two streams in enough amounts to reach the target peak temperatures. The reaction mixture was depressurized by product valve, cooled and polymer was separated from unreacted gas.

The obtained LDPE1 had Vinyl groups in amount of 0.82/1000 C and MFR$_2$=2.1 g/10 min

LDPE 2: Homopolymer of Ethylene (Comparative Polymer)

Purified ethylene was liquefied by compression and cooling to a pressure of 90 bars and a temperature of −30° C. and split up into to two equal streams of roughly 14 tons/hour each. The CTA (methyl ethyl ketone, MEK), air and a commercial peroxide radical initiator dissolved in a solvent were added to the two liquid ethylene streams in individual amounts. The two mixtures were separately pumped through an array of 4 intensifiers to reach pressures of 2100-2300 bars and exit temperatures of around 40° C. These two streams were respectively fed to the front (zone 1) (50%) and side (zone 2) (50%) of a split-feed two-zone tubular reactor. The inner diameters and lengths of the two reactor zones were 32 mm and 200 m for zone 1 and 38 mm and 400 m for zone 2. MEK was added in amounts of around 216 kg/h to the front stream to maintain a MFR$_2$ of around 2 g/10 min. The front feed stream was passed through a heating section to reach a temperature sufficient for the exothermal polymerization reaction to start. The reaction reached peak temperatures were around 250° C. and 318° C. in the first and second zones, respectively. The side feed stream cooled the reaction to an initiation temperature of the second zone of 165-170° C. Air and peroxide solution was added to the two streams in enough amounts to reach the target peak temperatures. The reaction mixture was depressurized by product valve, cooled and polymer was separated from unreacted gas.

The obtained LDPE2 had Vinyl groups in amount of 0.11/1000 C and MFR$_2$=2.0 g/10 min.

Antioxidant (AO): 2,4-bis(octylthiomethyl)-6-methylphenol (CAS number 110553-27-0) which is commercially available.

Peroxide (PDX): dicumylperoxide (CAS number 80-43-3)

The test polymer compositions are given in table 1 which also shows the results of the WTR determination.

TABLE 1

| | LDPE1 (wt %) | LDPE2 (wt %) | AO (wt %) | POX (wt %) | Water tree length, (mm) | Water tree width (mm) |
|---|---|---|---|---|---|---|
| The given (wt % based on the total amount of the polymer composition: | | | | | | |
| Inventive comp. 1 | 97.69 | | 0.21 | 0.95 | 0.50 | 0.76 |
| Comparative comp. 1 | | 98.84 | 0.21 | 2.1 | 0.73 | 1.07 |
| Vinyl groups/1000C | 0.82/1000C | 0.11/1000C | | | | |

The results show the improved WTR properties, both in the length and width of the water tree, of the inventive composition 1 which contains the inventive combination of vinyl groups together with the antioxidant compared to comparative composition. Moreover, the inventive composition 1 and the comparative composition had the similar crosslinking level, although the amount of the added peroxide of the inventive composition 1 could be kept lower. And still the inventive composition 1 has still improved WTR property is achieved.

The invention claimed is:

1. A polymer composition comprising:
a polyolefin (A) and
an antioxidant selected from a phenol which bears two substituents both containing a sulfur atom and optionally further substituent(s), and
wherein the polymer composition comprises vinyl groups/1000 carbon atoms in an amount of 0.15/1000 carbon atoms or more, when determined according to "double bond content" described above under Determination methods.

2. The polymer composition according to claim 1, wherein the antioxidant is bis[(C1-C12)alkylthio(C1-C12)alkyl]phenol which optionally bears further substituent(s).

3. The polymer composition according to claim 1, wherein the antioxidant is 2,4-bis(octylthiomethyl)-6-methylphenol (CAS number 110553-27-0).

4. The polymer composition according to claim 1, wherein the polyolefin (A) is unsaturated and comprises vinyl groups/1000 carbon atoms in an amount of 0.15/1000 carbon atoms or more.

5. The polymer composition according to claim 1, wherein the polyolefin (A) is an unsaturated polyethylene.

6. The polymer composition according to claim 1, wherein the polyolefin (A) is an unsaturated polyethylene produced in a high pressure polymerization process or an unsaturated copolymer of ethylene with at least one comonomer (LDPE copolymer).

7. The polymer composition according to claim 6, wherein the polyolefin (A) is an unsaturated LDPE copolymer of ethylene with at least a polyunsaturated comonomer which is a diene selected from $C_8$- to $C_{14}$-non-conjugated diene or mixtures thereof.

8. The polymer composition according to claim 1, wherein the polymer composition further comprises a crosslinking agent.

9. The polymer composition according to claim 8, wherein the crosslinking agent is a free radical generating agent.

10. A cable which is selected from:
a cable (A) comprising a conductor surrounded by at least one layer comprising the polymer composition of claim 1; or
a cable (B) comprising a conductor surrounded by an inner semiconductive layer, an insulating layer and an outer semiconductive layer, wherein at least the insulation layer, comprises the polymer composition of claim 1.

11. A process for producing:
(i) cable (A) according to claim 10, wherein the process comprises the steps of:
(a1) providing and mixing the polymer composition;
(b1) applying the polymer composition obtained from step (a1) on a conductor to form at least one layer of the cable (A); and
(c1) optionally crosslinking the obtained at least one layer in the presence of the crosslinking agent; or
(ii) cable (B) according to claim 10 comprising a conductor surrounded by an inner semiconductive layer, an insulation layer, and an outer semiconductive layer, in that order, wherein the process comprises the steps of:
(a1)
providing and mixing a first semiconductive composition comprising a polymer, a conductive filler and optionally further component(s) for the inner semiconductive layer,
providing and mixing a polymer composition for the insulation layer,
providing and mixing a second semiconductive composition comprising a polymer, a conductive filler and optionally further component(s) for the outer semiconductive layer;
(b1)
applying on a conductor,
the first semiconductive composition obtained from step (a1) to form the inner semiconductive layer,
polymer composition obtained from step (a1) to form the insulation layer, and
the second semiconductive composition obtained from step (a1) to form the outer semiconductive layer, wherein at least the polymer composition of the obtained insulation layer comprises the polymer composition; and
(c1)
optionally crosslinking the obtained insulation layer, optionally the obtained inner semiconductive layer and optionally the outer semiconductive layer in the presence of a crosslinking agent.

12. The process according to claim 11, wherein the polymer composition of claim 1 is provided to step (a1) already in a form of a blend which is produced beforehand by mixing the polyolefin (A) and the antioxidant together; or the polyolefin (A) and the antioxidant are provided separately to step (a1) and mixed together during the mixing step (a1) to form the polymer composition.

13. The process according to claim 11, wherein the antioxidant is added to polyolefin (A) in form of a liquid to form the blend which is then provided to step (a1); or the antioxidant is added separately in liquid form to polyolefin (A) during the mixing step (a1).

14. The process according to claim 11, wherein the at least one layer of formed cable (A) or at least the insulation layer of the formed cable (B) is crosslinked in step (c1) in the presence of a free radical forming agent.

15. The process according to claim 11, wherein the crosslinking agent is added to polyolefin (A) in form of a liquid when producing the blend of the polyolefin (A) and the antioxidant and the blend is then provided to step (a1); or the crosslinking agent is added separately in liquid form to polyolefin (A) during the mixing step (a1).

16. The polymer composition according to claim 1, wherein the polyolefin (A) is an unsaturated low density homopolymer of ethylene (LDPE homopolymer) or an unsaturated copolymer of ethylene with at least one comonomer (LDPE copolymer).

17. The polymer composition according to claim 1, wherein the polyolefin (A) is an unsaturated LDPE copolymer of ethylene with at least a polyunsaturated comonomer.

18. The polymer composition according to claim 17, wherein the polyunsaturated comonomer comprises a straight carbon chain with at least 8 carbon atoms and at least 4 carbons between non-conjugated double bonds, of which at least one is terminal.

19. The polymer composition according to claim 7, wherein the diene is selected from 1,7-octadiene, 1,9-decadiene, 1,11-dodecadiene, 1,13-tetradecadiene, 7-methyl-1,6-octadiene, 9-methyl-1,8-decadiene, or mixtures thereof.

* * * * *